(12) United States Patent
Kelly et al.

(10) Patent No.: US 10,458,337 B2
(45) Date of Patent: Oct. 29, 2019

(54) DUAL INLINE VALVE WITH MANUAL OVERRIDE

(71) Applicant: HAMILTON SUNDSTRAND CORPORATION, Charlotte, NC (US)

(72) Inventors: Myles R. Kelly, Willimantic, CT (US); Robert Goodman, West Hartford, CT (US); Michael D. Greenberg, Bloomfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 196 days.

(21) Appl. No.: 15/410,996

(22) Filed: Jan. 20, 2017

(65) Prior Publication Data

US 2018/0209347 A1    Jul. 26, 2018

(51) Int. Cl.
*F02C 7/26* (2006.01)
*F16K 1/32* (2006.01)
(Continued)

(52) U.S. Cl.
CPC .............. *F02C 7/26* (2013.01); *F01D 17/141* (2013.01); *F01D 19/02* (2013.01); *F01D 25/34* (2013.01); *F02C 7/277* (2013.01); *F02C 9/20* (2013.01); *F16K 1/123* (2013.01); *F16K 1/126* (2013.01); *F16K 31/143* (2013.01); *F16K 31/52* (2013.01); *F16K 31/54* (2013.01); *F16K 35/04* (2013.01); *F05D 2250/311* (2013.01); *F05D 2260/38* (2013.01); *F05D 2260/53* (2013.01); *F05D 2260/56* (2013.01); *F05D 2260/84* (2013.01);
(Continued)

(58) Field of Classification Search
CPC .......... F02C 7/26; F02C 9/20; F05D 2260/85; F16K 1/32
USPC ............................................... 137/613
See application file for complete search history.

(56) References Cited

U.S. PATENT DOCUMENTS 3,297,047 A    1/1967  Sime
3,792,716 A    2/1974  Sime et al.
(Continued)

FOREIGN PATENT DOCUMENTS

EP    3045699 A1    7/2016

OTHER PUBLICATIONS

EP EP Extended European Search Report for Application No. 18152830.8; Report dated Jun. 20, 2018; 1-9 pages.
(Continued)

*Primary Examiner* — Kevin L Lee
(74) *Attorney, Agent, or Firm* — Cantor Colburn LLP

(57) ABSTRACT

A starter air valve comprising: a housing comprising an inlet at a first end, an outlet at a second end opposite the first end, and a center portion between the first and second end, the outlet being fluidly connected to the inlet through a fluid passage; a first piston located within the housing between first end and center portion, the first piston configured to block airflow through the fluid passage when in a closed position and allow airflow through the fluid passage when in an open position; a second piston located within the housing between second end and center portion, the second piston configured to block airflow through the fluid passage when in a closed position and allow airflow through the fluid passage when in an open position; and a manual override system configured to move from closed to open position at least one of the first and second pistons.

13 Claims, 14 Drawing Sheets

(51) Int. Cl.
  *F02C 9/20* (2006.01)
  *F01D 17/14* (2006.01)
  *F01D 19/02* (2006.01)
  *F01D 25/34* (2006.01)
  *F02C 7/277* (2006.01)
  *F16K 1/12* (2006.01)
  *F16K 31/143* (2006.01)
  *F16K 31/52* (2006.01)
  *F16K 31/54* (2006.01)
  *F16K 35/04* (2006.01)

(52) U.S. Cl.
  CPC .... *F05D 2260/85* (2013.01); *F05D 2270/095* (2013.01); *F05D 2270/62* (2013.01)

(56) References Cited

U.S. PATENT DOCUMENTS

| | | |
|---|---|---|
| 3,915,587 A | 10/1975 | Rannenberg |
| 4,885,909 A | 12/1989 | Rodgers |
| 5,042,963 A | 8/1991 | Sorenson et al. |
| 6,446,657 B1 | 9/2002 | Dziorny et al. |
| 9,157,374 B2 * | 10/2015 | Cortelli et al. ........... F02C 7/27 |
| 9,689,315 B2 | 6/2017 | Marocchini et al. |
| 9,849,992 B2 | 12/2017 | Goodman et al. |
| 2011/0240126 A1 | 10/2011 | Lymberopoulos et al. |
| 2014/0060076 A1 | 3/2014 | Cortelli et al. |
| 2016/0237915 A1 | 8/2016 | Villanueva et al. |
| 2017/0234237 A1 * | 8/2017 | Pech et al. ................ F02C 7/32 60/778 |

OTHER PUBLICATIONS

EP Extended European Search Report for Application No. 18152778.9; Report dated Jun. 20, 2018; 1-9 pages.
Extended European Search Report for Application No. 18152771.4; Report dated Jun. 19, 2018; 1-7 pages.

\* cited by examiner

DUAL INLINE VALVE WITH MANUAL OVERRIDE

BACKGROUND

The subject matter disclosed herein generally relates to air valves and, more particularly, to air valves of aircraft engines.

Gas turbine engines used on modern aircraft are composed of a compressor, a combustion chamber, a turbine, and a main shaft connecting the turbine to the compressor. External air is compressed by the compressor and sent to the combustion chamber where an air-gas mixture combusts and provides thrust to the aircraft as it exits the engine. The combusted air-gas mixture also rotates the turbine as it exits the engine and the turbine rotates the compressor through the main shaft. At various times, the main shaft may need to be slowly rotated or motored to maintain thermal equilibrium throughout the engine.

In one example, after shutdown, the aircraft engine main shaft begins to bow due to thermal properties which can result in the rotor tips contacting the case wear path. This bowed condition is called the bowed rotor condition (BRC). The BRC creates the need for sub-idle motoring to cool the engine. When performing a manual start using an air valve may fail closed and method to open the failed air valve is desired.

SUMMARY

According to one embodiment, starter air valve is provided. The starter air valve comprising: a housing comprising an inlet at a first end, an outlet at a second end opposite the first end, and a center portion between the first end and the second end, the outlet being fluidly connected to the inlet through a fluid passage; a first piston located within the housing between the first end and the center portion, the first piston configured to block airflow through the fluid passage when in a closed position and allow airflow through the fluid passage when in an open position; a second piston located within the housing between the second end and the center portion, the second piston configured to block airflow through the fluid passage when in a closed position and allow airflow through the fluid passage when in an open position; and a manual override system configured to move from the closed position to the open position at least one of the first piston and the second piston.

In addition to one or more of the features described above, or as an alternative, further embodiments of the starter air valve may include that the manual override system includes a dual manual override, the dual manual override comprising: a first manual override having a first input point operably connected to the first piston through a first control arm, the first input point configured to rotate the first control arm when the first input point is rotated, wherein the first piston moves from the closed position to the open position when the first control arm is rotated.

In addition to one or more of the features described above, or as an alternative, further embodiments of the starter air valve may include that the first manual override further comprises: a first ball detent system operable to lock the first manual override in a first open position, wherein the first ball detent system further comprises: a first plate having a first open hole at the first open position; a first ball located opposite the first plate; and a first biasing mechanism configured to press first ball against the first plate and secure the first ball in the first open hole when first ball detent system is in the first open position.

In addition to one or more of the features described above, or as an alternative, further embodiments of the starter air valve may include that the manual override system includes a dual manual override, the dual manual override comprising: a second manual override having a second input point operably connected to the second piston through a second control arm, the second input point configured to rotate the second control arm when the second input point is rotated, wherein the second piston moves from the closed position to the open position when the second control arm is rotated.

In addition to one or more of the features described above, or as an alternative, further embodiments of the starter air valve may include that the second manual override further comprises: a second ball detent system operable to lock the second manual override in a second open position, wherein the second ball detent system further comprises: a second plate having a second open hole at the second open position: a second ball located opposite the second plate; and a second biasing mechanism configured to press second ball against the second plate and secure the second ball in the second open hole when second ball detent system is in the second open position.

In addition to one or more of the features described above, or as an alternative, further embodiments of the starter air valve may include that the manual override system includes a dual manual override, the dual manual override comprising: a first manual override having a first input point operably connected to the first piston through a first control arm, the first input point configured to rotate the first control arm when the first input point is rotated, wherein the first piston moves from the closed position to the open position when the first control arm is rotated; and a second manual override having a second input point operably connected to the second piston through a second control arm, the second input point configured to rotate the second control arm when the second input point is rotated, wherein the second piston moves from the closed position to the open position when the second control arm is rotated.

In addition to one or more of the features described above, or as an alternative, further embodiments of the starter air valve may include that the manual override system includes a single manual override, the single manual override further comprising: a single input point; a gear rack operably connected to the single input point; a first control arm operably connecting the first piston to the gear rack; and a second control arm operably connecting the second piston to the gear rack.

In addition to one or more of the features described above, or as an alternative, further embodiments of the starter air valve may include that the gear rack is configured to translate in at least one of a first direction and a second direction when the single input point is rotated.

In addition to one or more of the features described above, or as an alternative, further embodiments of the starter air valve may include that the first control arm rotates when the gear rack translates in a second direction; and the first piston moves from the closed position to the open position when the first control arm is rotated.

In addition to one or more of the features described above, or as an alternative, further embodiments of the starter air valve may include that the second control arm rotates when the gear rack translates in a first direction; and the second piston moves from the closed position to the open position when the second control arm is rotated.

In addition to one or more of the features described above, or as an alternative, further embodiments of the starter air valve may include that the single manual override further comprises: a ball detent system operable to lock the single manual override in at least one of a neutral position disengaging the single manual override from the first piston and the second piston, a first open position when the first piston is in the open position, and a second open position when the second piston is in the open position.

In addition to one or more of the features described above, or as an alternative, further embodiments of the starter air valve may include that the ball detent system further comprises: a plate having a first open hole at the first open position, a second open hole at the second open position, and a neutral hole at the neutral position; a ball located opposite the plate; a biasing mechanism configured to press ball against the plate and secure the ball in at least one of the first open hole when the single manual override is in the first open position, the second open hole when the single manual override is in the second open position, and the neutral hole when the single manual override is in the neutral position.

According to another embodiment, a method of operating a starter air valve comprising a housing having an inlet at a first end, an outlet at a second end opposite the first end, and a center portion between the first end and the second end, the outlet being fluidly connected to the inlet through a fluid passage is provided. The method comprising: regulating the airflow through the fluid passage using a first piston located within the housing between the first end and the center portion, the first piston configured to block airflow through the fluid passage when in a closed position and allow airflow through the fluid passage when in an open position; regulating the airflow through the fluid passage using a second piston located within the housing between the second end and the center portion, the second piston configured to block airflow through the fluid passage when in a closed position and allow airflow through the fluid passage when in an open position; and moving, using a manual override system, from the closed position to the open position at least one of the first piston and the second piston.

In addition to one or more of the features described above, or as an alternative, further embodiments of the method may include rotating a first input point of a first manual override within the manual override system, the first input point operably connected to the first piston through a first control arm and configured to rotate the first control arm when the first input point is rotated, wherein the first piston moves from the closed position to the open position when the first control arm is rotated.

In addition to one or more of the features described above, or as an alternative, further embodiments of the method may include: locking the first manual override in a first open position, using a first ball detent system; wherein the first ball detent system comprises: a first plate having a first open hole at the first open position; a first ball located opposite the first plate; and a first biasing mechanism configured to press first ball against the first plate and secure the first ball in the first open hole when first ball detent system is in the first open position.

In addition to one or more of the features described above, or as an alternative, further embodiments of the method may include rotating a second input point of a second manual override within the manual override system, the second input point operably connected to the second piston through a second control arm and configured to rotate the second control arm when the second input point is rotated, wherein the second piston moves from the closed position to the open position when the second control arm is rotated.

In addition to one or more of the features described above, or as an alternative, further embodiments of the method may include: rotating a single input point of a single manual override within the manual override system, wherein the single manual override comprises: a gear rack operably connected to the single input point; a first control arm operably connecting the first piston to the gear rack; and a second control arm operably connecting the second piston to the gear rack; and translating the gear rack in at least one of a first direction and a second direction when the single input point is rotated.

In addition to one or more of the features described above, or as an alternative, further embodiments of the method may include rotating the first control arm when the gear rack translates in the second direction, wherein the first piston moves from the closed position to the open position when the first control arm is rotated.

In addition to one or more of the features described above, or as an alternative, further embodiments of the method may include rotating the second control arm when the gear rack translates in the first direction, wherein the second piston moves from the closed position to the open position when the second control arm is rotated.

In addition to one or more of the features described above, or as an alternative, further embodiments of the method may include locking, using a ball detent system, the single manual override in at least one of a neutral position disengaging the single manual override from the first piston and the second piston, a first open position when the first piston is in the open position, and a second open position when the second piston is in the open position.

Technical effects of embodiments of the present disclosure include a manual override system to force open a failed dual inline starter air valve. The dual inline starter air valve configured to ensure proper airflow to an engine upon startup and thermodynamic motoring using a first piston and a second piston to regulate airflow through the valve and to the engine.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
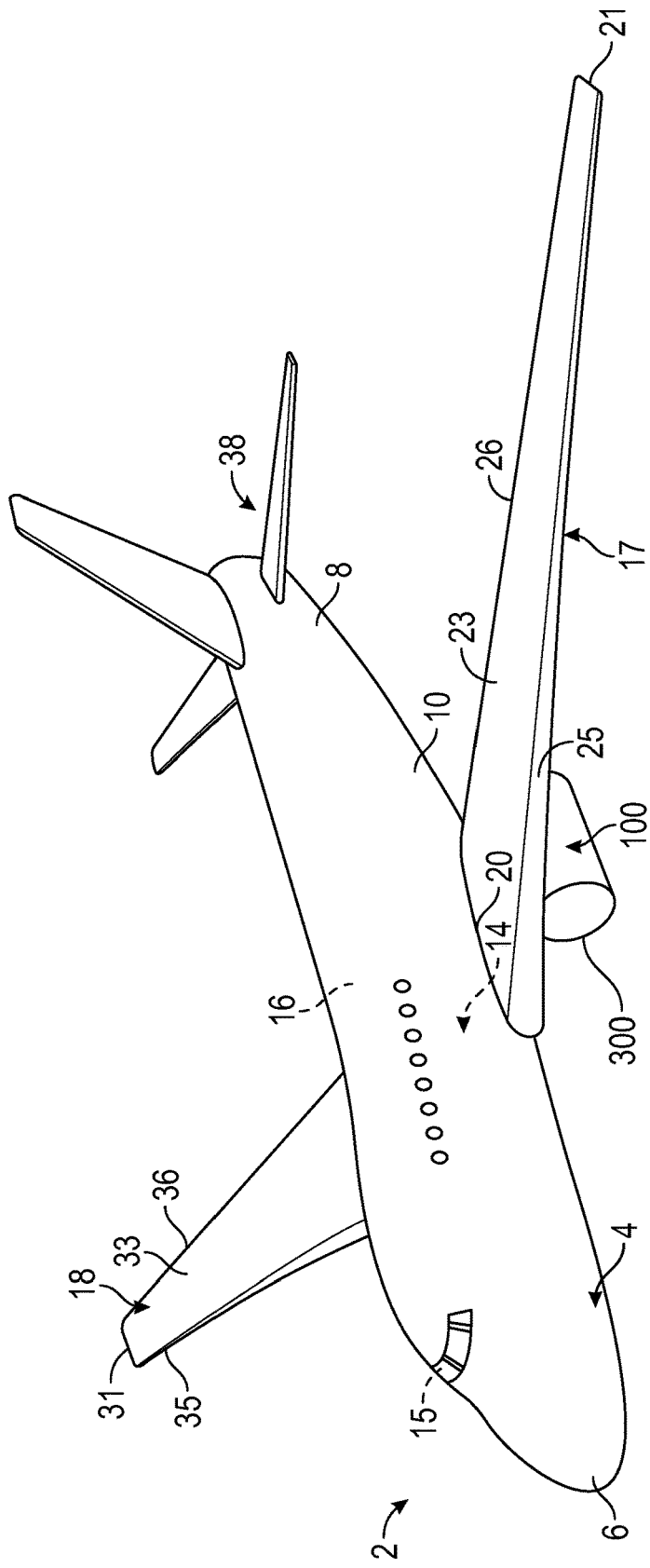
FIG. 1 is a schematic diagram of an aircraft that may incorporate various embodiments of the present disclosure.

Referring now to FIG. 1, which shows a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes an engine 300 configured to provide propulsion to the aircraft 2 and a dual inline starter air valve 100 configured to regulate airflow to an air turbine starter 301(see FIG. 2) of the engine 300.

Figure 2:
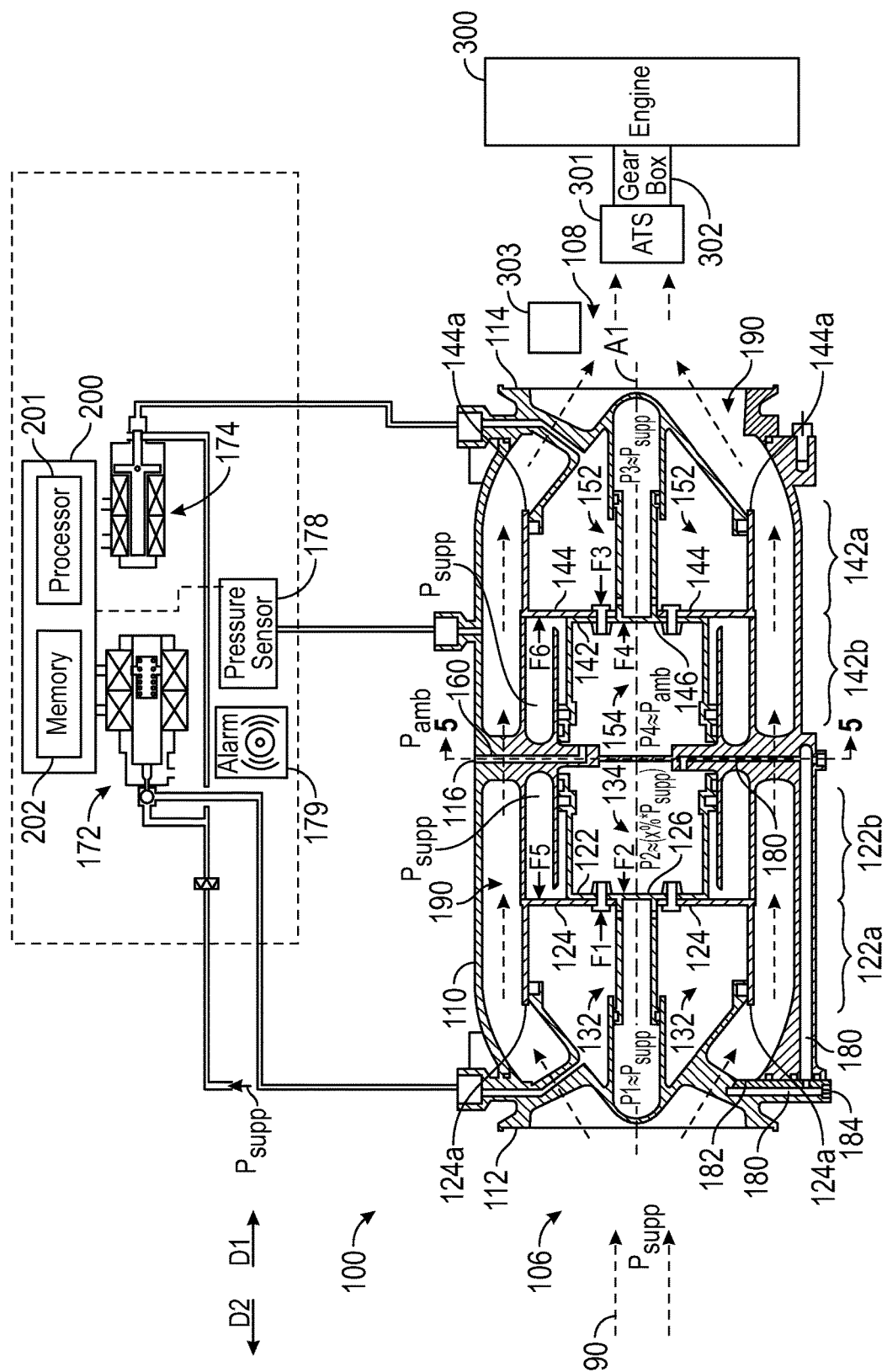
FIG. 2 is a schematic, cross-sectional illustration of a dual inline starter air valve with two pistons in an open position, in accordance with an embodiment of the present disclosure.
Figure 3:
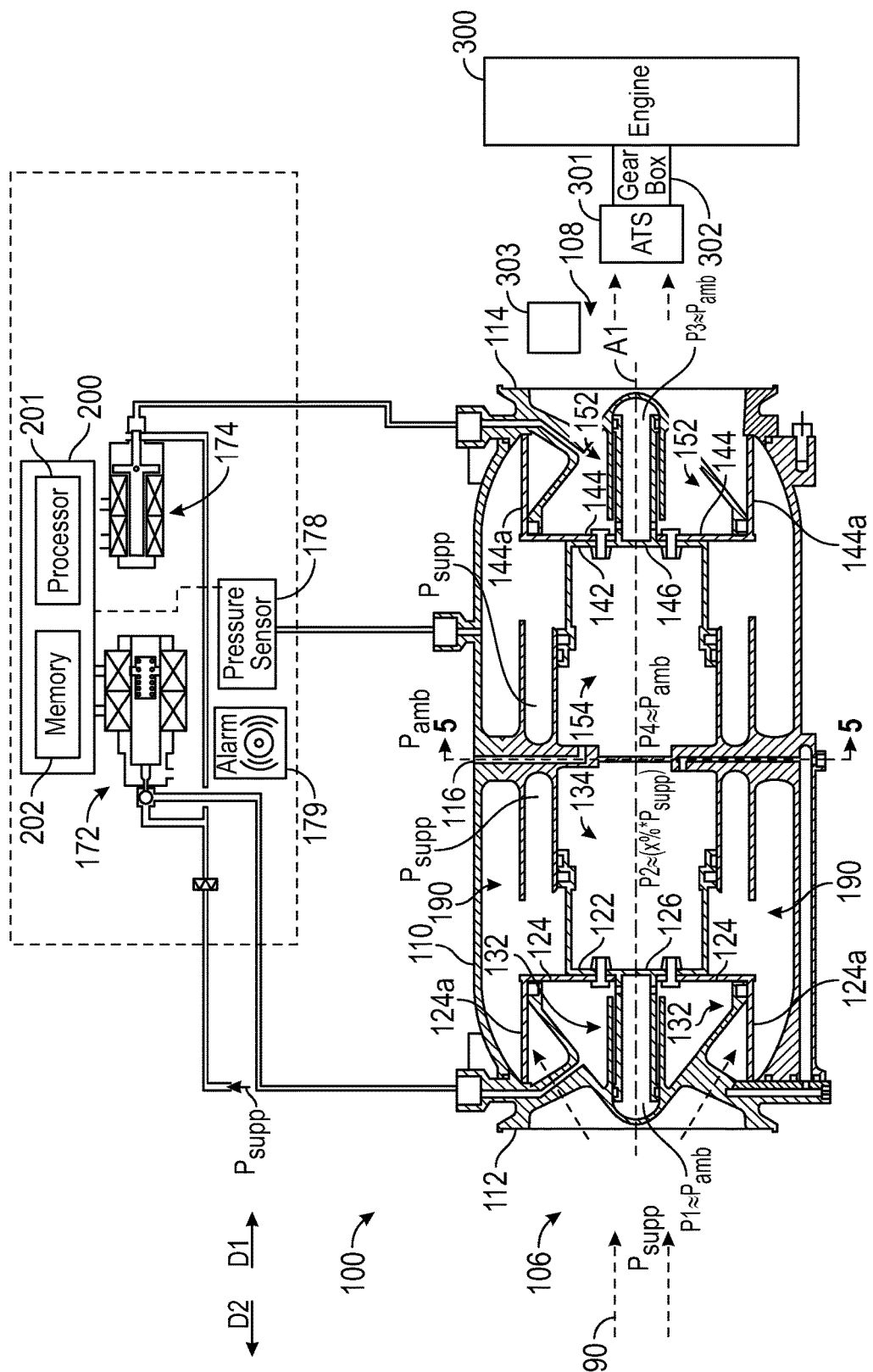
FIG. 3 is a schematic, cross-sectional illustration of a dual inline starter air valve with two pistons in a closed position, in accordance with an embodiment of the present disclosure.
Figure 4:
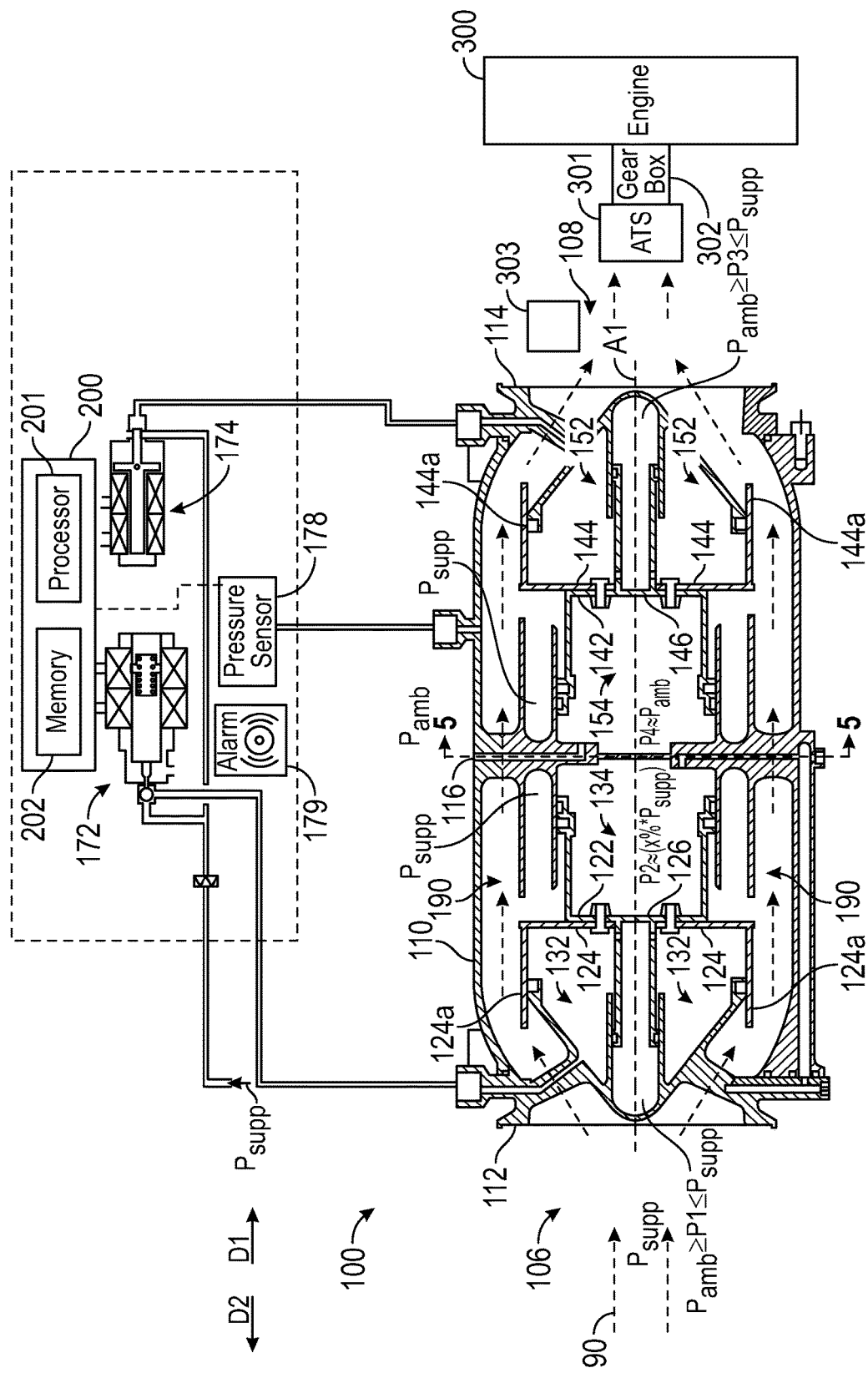
FIG. 4 is a schematic, cross-sectional illustration of a dual inline starter air valve with two pistons in a modulating position, in accordance with an embodiment of the present disclosure.
Figure 5:
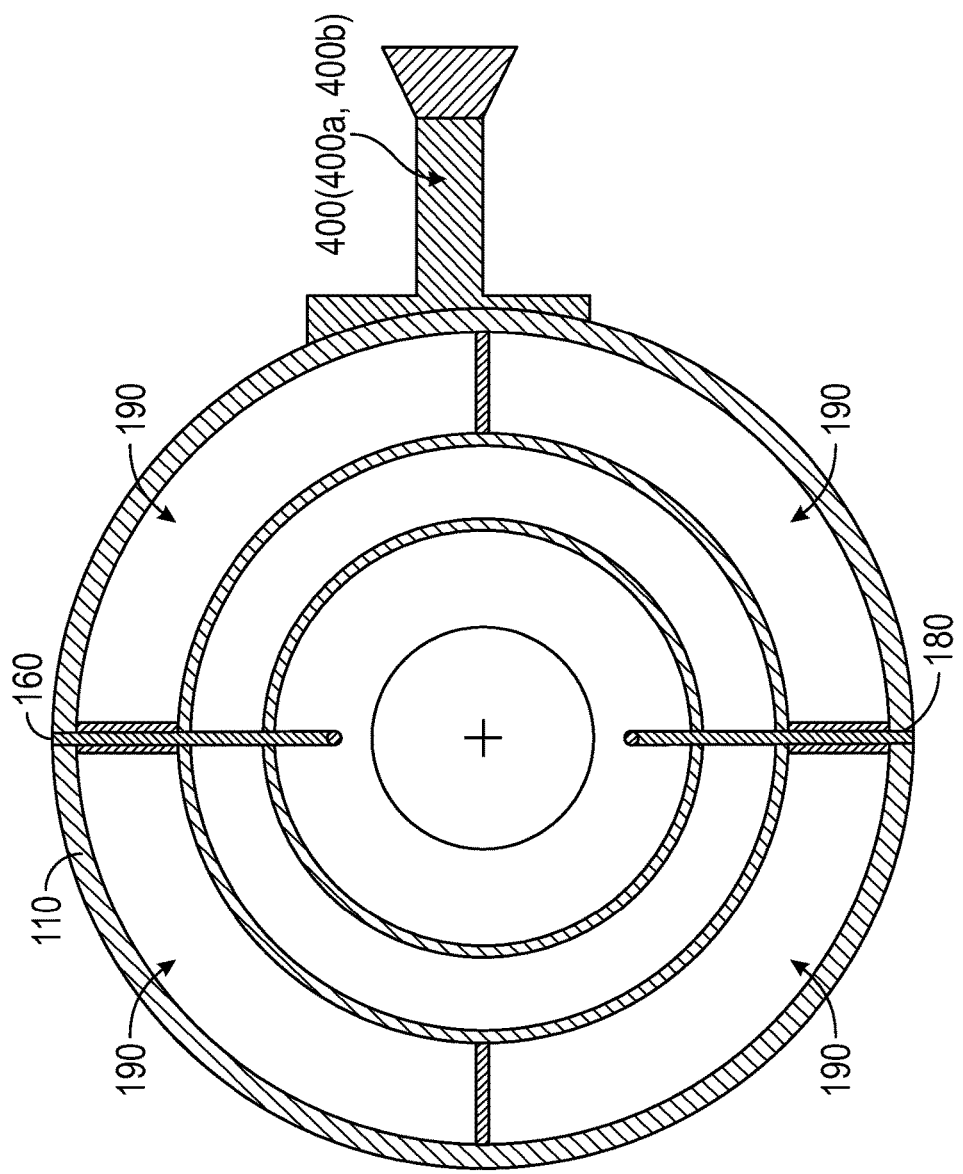
FIG. 5 is a schematic, axial illustration of a dual inline starter air valve having a manual override, in accordance with an embodiment of the present disclosure.
Figure 6:
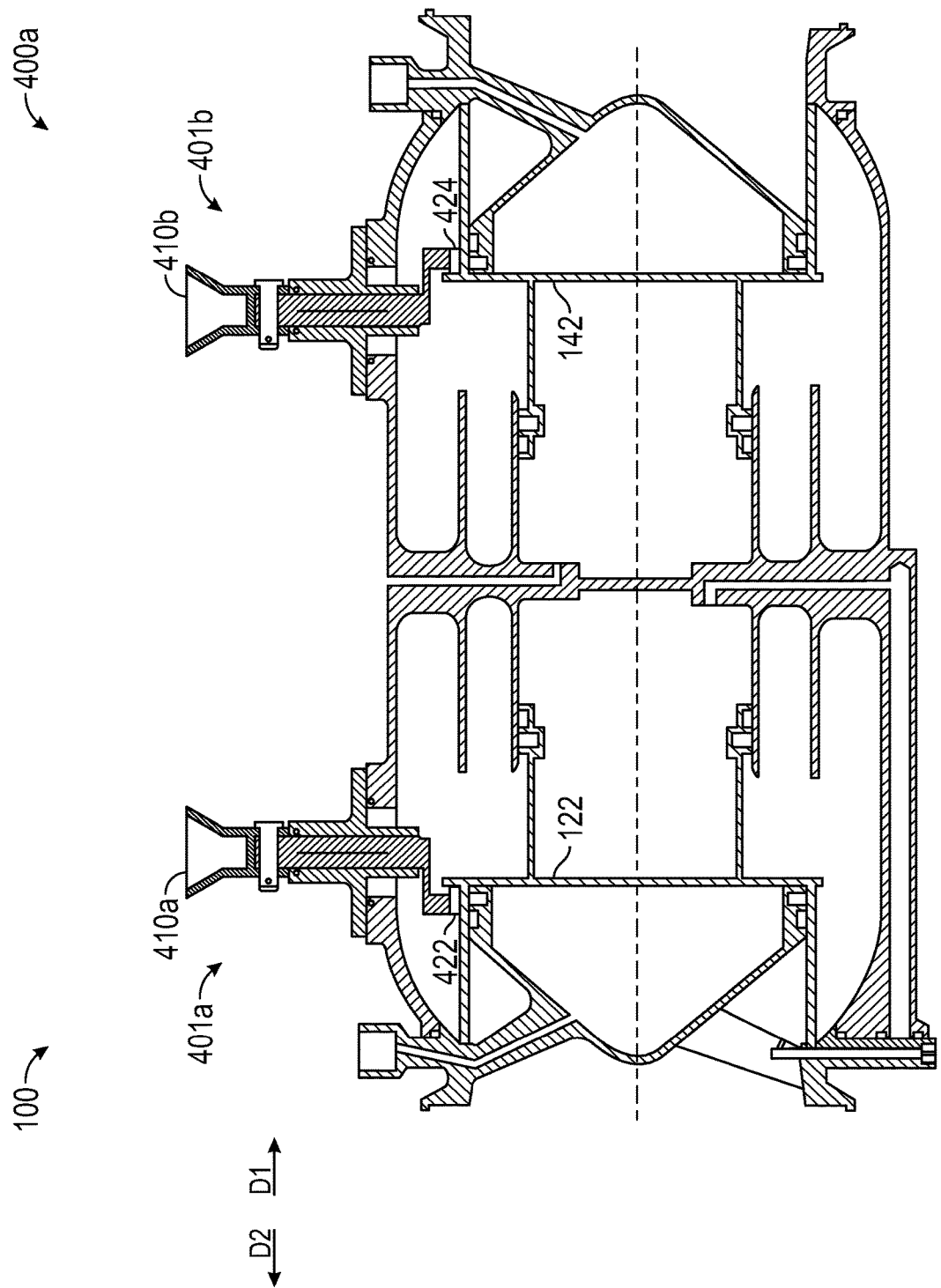
FIG. 6 is a schematic, cross-sectional illustration of a dual inline starter air valve having a dual manual override, in accordance with an embodiment of the present disclosure.
Figure 7:
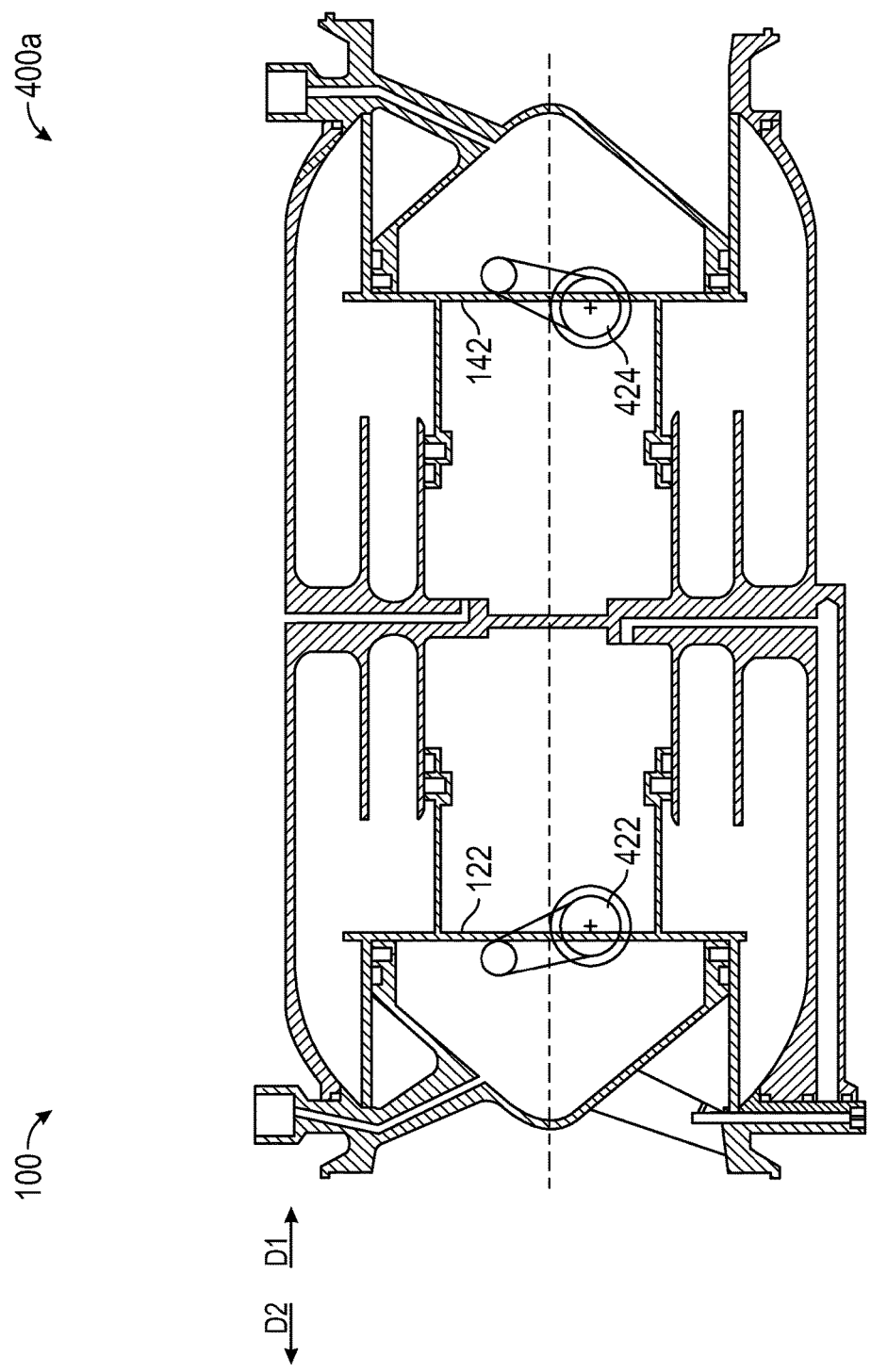
FIG. 7 is a schematic, cross-sectional illustration of a dual inline starter air valve having a dual manual override with the first piston and the second piston in a closed position, in accordance with an embodiment of the present disclosure.
Figure 8:
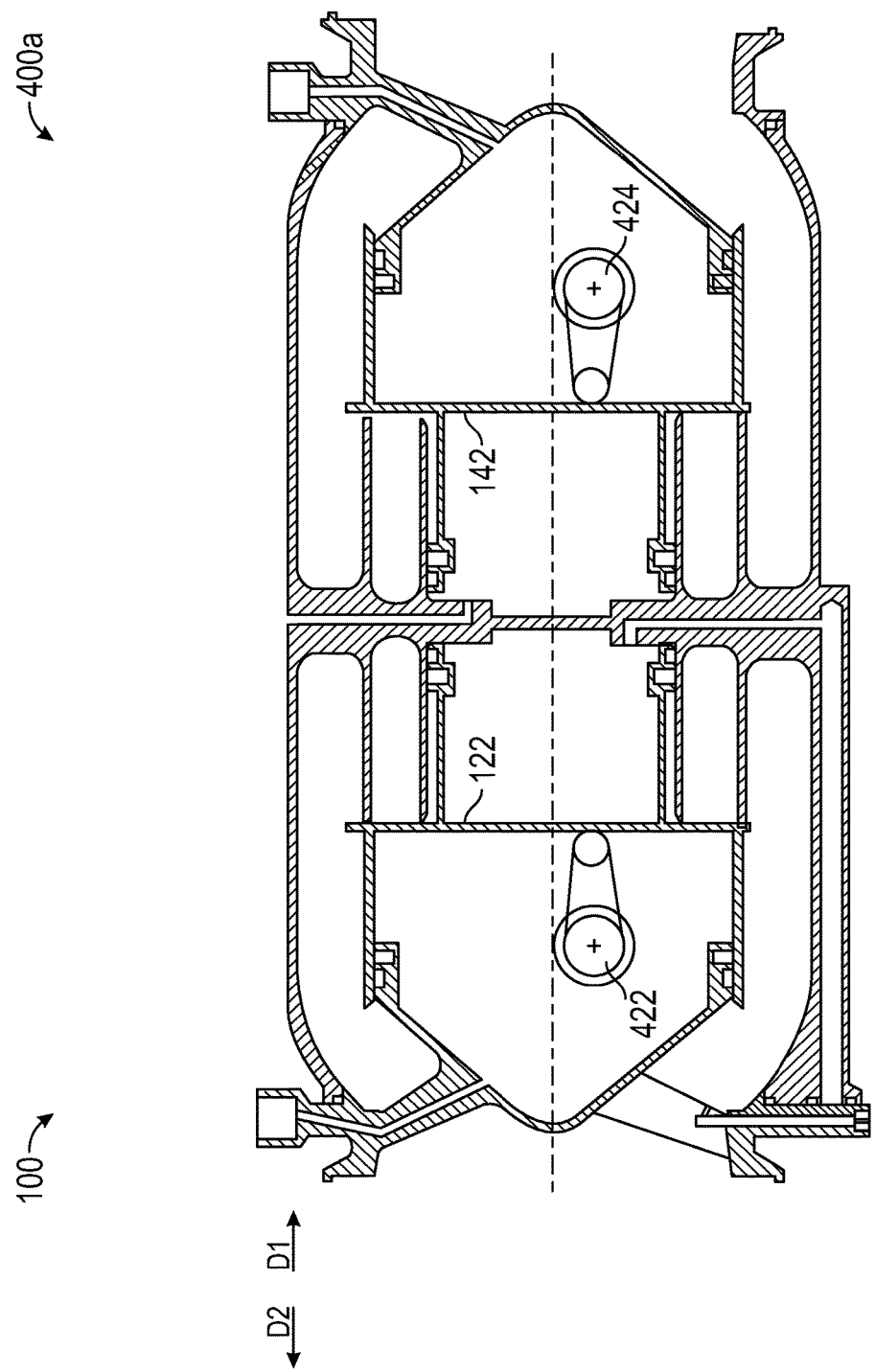
FIG. 8 is a schematic, cross-sectional illustration of a dual inline starter air valve having a dual manual override with the first piston and the second piston in an open position, in accordance with an embodiment of the present disclosure.

Referring now to FIGS. 2-4, the dual inline starter air valve 100 is illustrated according to an embodiment of the present disclosure. As shown in FIGS. 2-4, the air valve 100 comprises a housing 110, a first piston 122, and a second piston 142. The housing comprises an inlet 106 at a first end 112, an outlet 108 at a second end 114 opposite the first end 112, and a center portion 116 between the first end 112 and the second end 114. The outlet 108 is fluidly connected to the inlet 106 through a fluid passage 190. The center portion is a wall about half way between the first end 112 and the second end 114.

As seen in FIGS. 2-4, the first piston 122 is located within the housing 110 between the first end 112 and the center portion 116. The first piston 122 comprises a first cupped portion 122a configured to form a first chamber 132 with the housing 110 proximate the first end 112. The first chamber 132 is filled with a fluid (ex: air) to create a first pressure P1 within the first chamber 132. The first pressure P1 acts on a first surface 124 of the first piston 122. The first piston 122 also comprises second cupped portion 122b opposite the first cupped portion 122a. The second cupped portion 122b is configured to form a second chamber 134 with the housing 110 proximate the center portion 116. The second chamber 134 is filled with a fluid (ex: air) to create a second pressure P2 within the second chamber 134. The second pressure P2 acts on a second surface 126 of the first piston. The second surface 126 is opposite the first surface 124.

The first piston 122 translates in either the first direction D1 or second direction D2 in response to the first pressure P1 and the second pressure P2. The first pressure P1 applied over the surface area of the first surface 124 creates a first force F1. The second pressure P2 applied over the surface area of the second surface 126 creates a second force F2 opposite the first force F1. A fifth force F5 is created by the supply pressure $P_{supp}$ and the differential area between the first surface 124 and the second surface 126. Thus, the balance of forces F1, F2, F5 will cause the first piston 122 to move in either the first direction D1 or the second direction D2. If the first force F1 is greater than the second force F2 and the fifth force F5 combined, then the first piston 122 moves in the first direction D1. If the second force F2 and the fifth force F5 is greater than the first force F1, then the first piston 122 moves in the second direction D2. If the second force F2 and the fifth force F5 combined is balanced with the first force F1 then the first piston 122 will not move. In an embodiment, the first surface 124 may have a different surface area than the second surface 126. In another embodiment, the first surface 124 may have a larger surface area than the second surface 126. In yet another embodiment, the first surface 124 may have about twice the surface area as the second surface 126.

As seen in FIGS. 2-4 the second piston 142 is located within the housing 110 between the second end 114 and the center portion 116. The second piston 142 comprises a third cupped portion 142a configured to form a third chamber 152 with the housing 110 proximate the second end 114. The third chamber 152 is filled with a fluid (ex: air) to create a third pressure P3 within the third chamber 152. The third pressure P3 acts on a third surface 144 of the second piston 142. The second piston 142 also comprises fourth cupped portion 142b opposite the third cupped portion 142a. The fourth cupped portion 142b is configured to form a fourth chamber 154 with the housing 110 proximate the center portion 116. The fourth chamber 154 is filled with a fluid (ex: air) to create a fourth pressure P4 within the fourth chamber 154. The fourth pressure P4 acts on a fourth surface 146 of the second piston 142. The fourth surface 146 is opposite the third surface 144.

The second piston 142 translates in either the first direction D1 or second direction D2 in response to the third pressure P3 and the fourth pressure P4. The third pressure P3 applied over the surface area of the third surface 144 creates a third force F3.

The fourth pressure P4 applied over the surface area of the fourth surface 146 creates a fourth force F4 opposite the third force F3. A sixth force F6 is created by the supply pressure $P_{supp}$ and the differential area between the third surface 144 and the fourth surface 146. Thus, the balance of forces F3, F4, F6 will cause the second piston 142 to move in either the first direction D1 or the second direction D2. If the third force F3 is greater than the fourth force F4 and the sixth force F6 combined, then the second piston 142 moves in the second direction D2. If the fourth force F4 and the sixth force F6 combined is greater than the third force F3, then the second piston 142 moves in the first direction D 1. If the fourth force F4 and sixth force F6 combined are balanced with the third force then the second piston 142 will not move. In an embodiment, the third surface 144 may have a different surface area than the fourth surface 146. In another embodiment, the third surface 144 may have a larger surface area than the fourth surface 146. In yet another embodiment, the third surface 144 may have about twice the surface area as the fourth surface 146.

The airflow 90 moving out of the outlet 108 will move into an air turbine starter 301. The air turbine starter 301 is rotated by the airflow 90 and transfers the rotational energy through a gearbox 302 to the combustion engine 300. The speed of the engine established by airflow 90 from the outlet 108 may be monitored by a speed sensor 303 and communicated to a controller 200. The controller 200, in response to the airflow 90, may then command an adjustment of pressures P1, P3 within the first chamber 132 and the third chamber 152 to move the pistons 122, 142 and regulate the airflow 90. Thus, the first piston 122 and the second piston 142 are configured to regulate airflow 90 through the fluid passage 190. In an embodiment, the first piston 122 and the second piston 142 are inline along a common center axis A1, as seen in FIGS. 2-4.

The first piston 122 is configured to regulate airflow 90 through the fluid passage 190 (and subsequently regulate the airflow 90 to the air turbine starter 301) by adjusting at least one of the first pressure P1 within the first chamber 132 and the second pressure P2 within the second chamber 134. The first piston 122 allows airflow through the fluid passage 190 when the first piston 122 is in the open position, as seen in FIG. 2. The first piston 122 blocks airflow through the fluid passage 190 when the first piston 122 is in the closed position, as seen in FIG. 3. While in the closed position, a first outer wall 124a of the first piston 122 extends across the fluid passage 190 to block the airflow 90 through the fluid passage 190. Further, depending on the balance between the first pressure P1 and the second pressure P2, the first piston 122 may be located in-between the open position of FIG. 2 and the closed position of FIG. 3, thus allowing the first outer wall 124a to only partially block the fluid passageway 190, as seen in FIG. 4. The airflow 90 through the fluid passageway 190 may be incrementally adjusted by incrementally blocking the fluid passageway 190 with the first outer wall 124a.

The second piston 142 is configured to regulate airflow 90 through the fluid passage 190 (and subsequently regulate the airflow 90 to the air turbine starter 301) by adjusting at least one of the third pressure P3 within the third chamber 152 and the fourth pressure P4 within the fourth chamber 154. The second piston 142 allows airflow through the fluid passage 190 when the second piston 142 is in the open position, as seen in FIG. 2. The second piston 142 blocks airflow through the fluid passage 190 when the second piston 142 is in the closed position, as seen in FIG. 3. While in the closed position, a second outer wall 144a of the second piston 142 extends across the fluid passage 190 to block the airflow 90 through the fluid passage 190. Further, depending on the balance between the third pressure P3 and the fourth pressure P4, the second piston 142 may be located in-between the open position of FIG. 2 and the closed position of FIG. 3, thus allowing the second outer wall 144a to only partially block the fluid passageway 190, as seen in FIG. 4. The airflow 90 through the fluid passageway 190 may be incrementally adjusted by incrementally blocking the fluid passageway 190 with the second outer wall 144a.

As may be appreciated by one of skill in the art, the pressure being supplied to each chamber 132, 134, 152, 154 may be supplied by various means. In the illustrated embodiment, the first pressure P1 within the first chamber 132 is supplied by solenoid valve 172 and the third pressure P3 within the third chamber 152 is supplied by a torque motor valve 174. The solenoid valve 172 is fluidly connected to the first chamber 132 and the torque motor valve 174 is fluidly connected the third chamber 152. The solenoid valve 172 is configured to adjust the first pressure P1 to the first chamber 132 and the torque motor valve 174 is configured to adjust the third pressure P3. In an alternate embodiment, the solenoid valve 172 may be fluidly connected to the third chamber 152 and configured to adjust the third pressure P3. In an alternate embodiment, the torque motor valve 174 may be fluidly connected to the first chamber 132 and configured to adjust the first pressure P1.

In the illustrated embodiment, the second pressure P2 within the second chamber 134 is supplied by an orifice divider network 180 fluidly connecting the second pressure chamber 134 to the fluid passage 190 at a first orifice 182, as shown in FIG. 2. The orifice divider network 180 is configured to provide airflow 90 from the fluid passage 190 to the second pressure chamber 134 at the selected percentage x % of the supply pressure $P_{supp}$ at the inlet 106. In an embodiment, the selected percentage x % is about 80% and thus the second pressure P2 is equal to about $0.8*P_{supp}$. The orifice divider network 180 is configured to achieve a second pressure P2 equal to about $0.8*P_{supp}$ utilizing a first orifice 182 and a second orifice 184. As may be appreciated by one of skill in the art, the orifice divider network 180 may utilize more or less than two orifices in order to achieve the selected percentage. In an embodiment, the first orifice 182 may have a diameter of about 0.050 inches (0.127 cm). In another embodiment, the second orifice 184 may have a diameter of about 0.050 inches (0.127 cm). Advantageously, the orifice divider network 180 ensures a higher opening force margin than would otherwise be present if supply pressure was ported to chamber 132.

In the illustrated embodiment, the fourth pressure P4 within the fourth chamber 154 supplied by an ambient fluid network 160 fluidly connecting air located outside of the housing 110 to the fourth chamber 154. The ambient fluid network 160 is configured to provide air from the outside of the housing 110 to the fourth chamber at about an ambient pressure $P_{amb}$, thus the fourth pressure P4 is equal to about the ambient pressure $P_{amb}$ of the air outside the housing 110.

As mentioned above, the first piston 122 is configured to regulate airflow 90 through the fluid passage 190 (and subsequently regulate the airflow 90 to the air turbine starter 301) by adjusting at least one of the first pressure P1 within the first chamber 132 and the second pressure P2 within the second chamber 134. In the illustrated embodiment, the second pressure P2 may remain the same while the first pressure P1 is adjusted to move the first piston 122. As seen in FIG. 2, when the first piston 122 is in the open position, the first pressure P1 is equal to about $P_{supp}$ and the second pressure P2 is equal to about x %*$P_{supp}$. As mentioned above, in an embodiment, the selected percentage x % is about 80%. FIG. 3 shows the first piston 122 in the closed position. As seen in FIG. 3, when the first piston 122 is in the closed position, the first pressure P1 is equal to about $P_{amb}$ and the second pressure P2 is equal to about x %*$P_{supp}$. Thus, the first pressure P1 has been reduced from $P_{supp}$ in FIG. 2 to $P_{amb}$ in FIG. 3 to allow the first piston 122 to close and thus block off airflow 90 through the fluid passage 190. In the event that pressure is lost, the first piston 122 is configured to fail safe in the closed position, as seen in FIG. 3.

As mentioned above, the second piston 142 is configured to regulate airflow 90 through the fluid passage 190 (and subsequently regulate the airflow 90 to the air turbine starter 301) by adjusting at least one of the first pressure P3 within the third chamber 152 and the fourth pressure P4 within the fourth chamber 154. In the illustrated embodiment, the fourth pressure P4 may remain the same while the third pressure P3 is adjusted to move the second piston 142. As seen in FIG. 2, when the second piston 142 is in the open position, the third pressure P3 is equal to about $P_{supp}$ and the fourth pressure P4 is equal to about $P_{amb}$. FIG. 3 shows the second piston 142 in the closed position. As seen in FIG. 3, when the second piston 142 is in the closed position, the third pressure P3 is equal to about $P_{amb}$ and the fourth pressure P4 is equal to about $P_{amb}$. Thus, the third pressure P3 has been reduced from $P_{supp}$ in FIG. 2 to $P_{amb}$ in FIG. 3 to allow the second piston 142 to close and thus block off airflow 90 through the fluid passage 190. In the event that pressure is lost, the second piston 142 is configured to fail safe in the closed position, as seen in FIG. 3.

FIG. 4 shows, for illustration, both pistons 122, 142 in the modulating position. The modulating position is located in-between the open position of FIG. 2 and the closed position of FIG. 3. In an embodiment, only one piston 122, 142 may be in the modulating position shown in FIG. 4 at any given time, while the other piston is in the open position shown in FIG. 2. In an embodiment, the second piston 142 is in the modulating position shown in FIG. 4, while the first piston 122 is in the open position shown in FIG. 2. When the first piston 122 is the modulating position, the first outer wall 124a partially blocks the fluid passageway 190. When the second piston 142 is the modulating position, the second outer wall 144a partially blocks the fluid passageway 190. The airflow 90 through the fluid passageway 190 may be incrementally adjusted by incrementally blocking the fluid passageway 190 with the first outer wall 124a and/or second outer wall 144a. Thus, the airflow 90 delivered to the air turbine starter 301 from the outlet 108 may be incrementally adjusted. In one example, for a normal engine startup both pistons 122, 142 may be commanded open. In a second example, the first piston 122 may be open while the second piston may be modulated for bowed rotor motoring (BRM) where the engine 300 is controlled to rotate at a low speed until the thermal differential across the engine 300 is mitigated. Advantageously, having two pistons allows one to be manually opened in the event of a failure and the other piston to be modulated for BRM. In a single piston air valve, if the single piston fails, modulation is not possible because the single piston must be manually held open.

Additionally, the air valve 100 may also be operably connected to a controller 200. The controller 200 may be in operable communication with the torque motor valve 174, the solenoid valve 172, the speed sensor 303, and a pressure sensor 178. The control controller 200 may be configured control the operation of the movement of the pistons 122, 142 by adjusting the pressures P1, P3 in the chambers 132, 152. The controller 200 may include a processor 201 and an associated memory 202. The processor 201 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 202 may be but is not limited to a random access memory (RAM), read only memory (ROM), or other electronic, optical, magnetic or any other computer readable medium. The pressure sensor 178 is configured to measure the pressure of the airflow 90 through the fluid passageway 190 and communicate the pressure measurement to the controller 200. The pressure sensor 178 is configured to activate an alarm 179 when the airflow pressure within the fluid passage way 190 is below a selected pressure, which would indicate a piston failure. The alarm 179 may be audible and/or visual.

Figure 11:
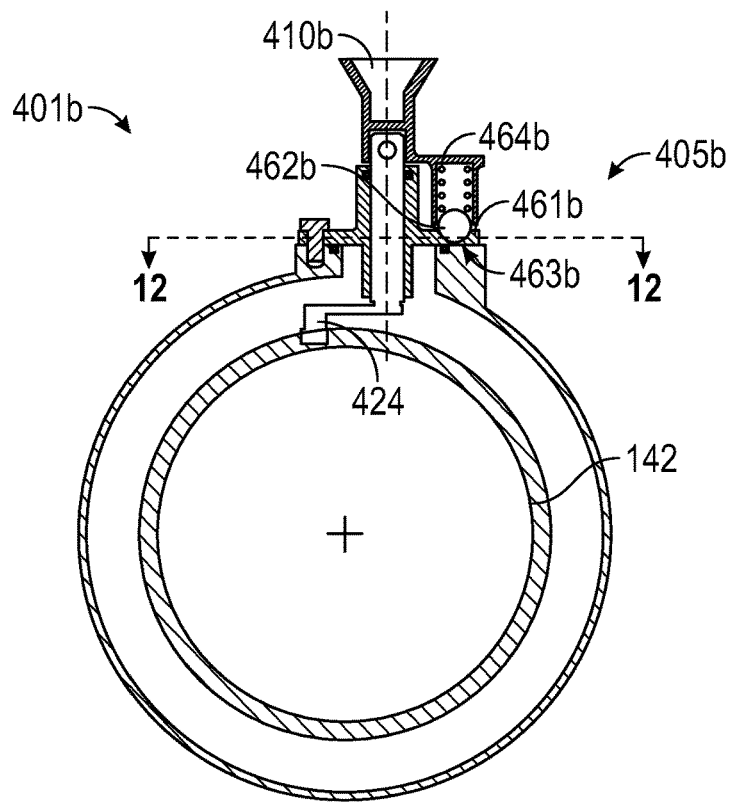
FIG. 11 is a schematic, axial view illustration of a second ball detent system of the dual inline starter air valve of FIG. 6, in accordance with an embodiment of the present disclosure.
Figure 12:
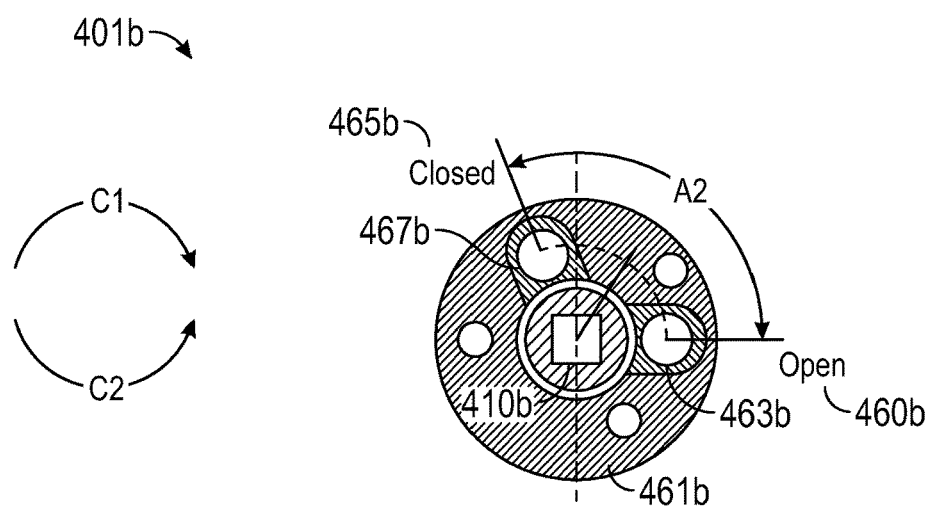
FIG. 12 is a schematic, top view illustration of a second ball detent system of the dual inline starter air valve of FIG. 6, in accordance with an embodiment of the present disclosure.
Figure 13:
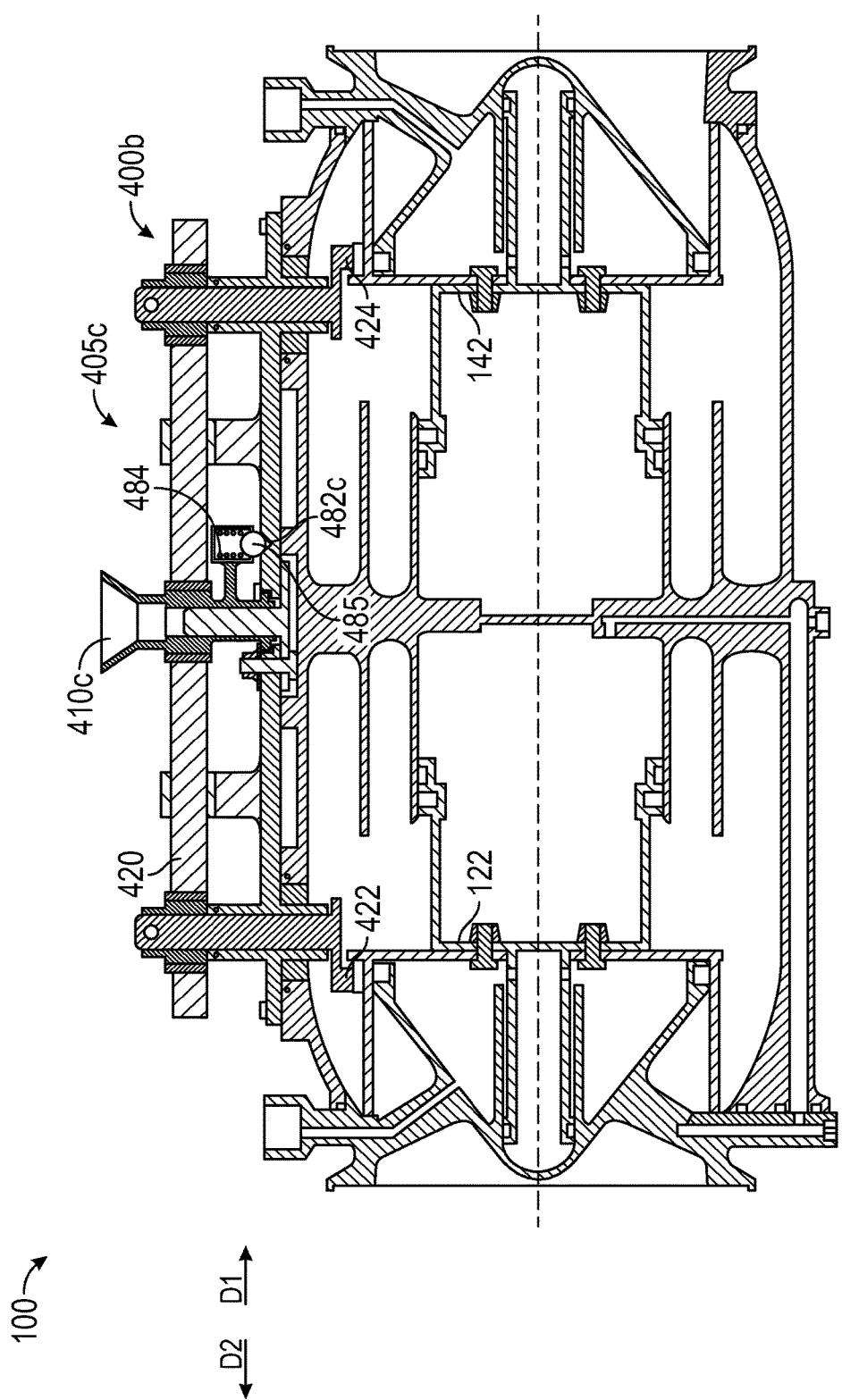
FIG. 13 is a schematic, cross-sectional illustration of a dual inline starter air valve having a single manual override with the first piston and the second piston in a closed position, in accordance with an embodiment of the present disclosure.
Figure 14:
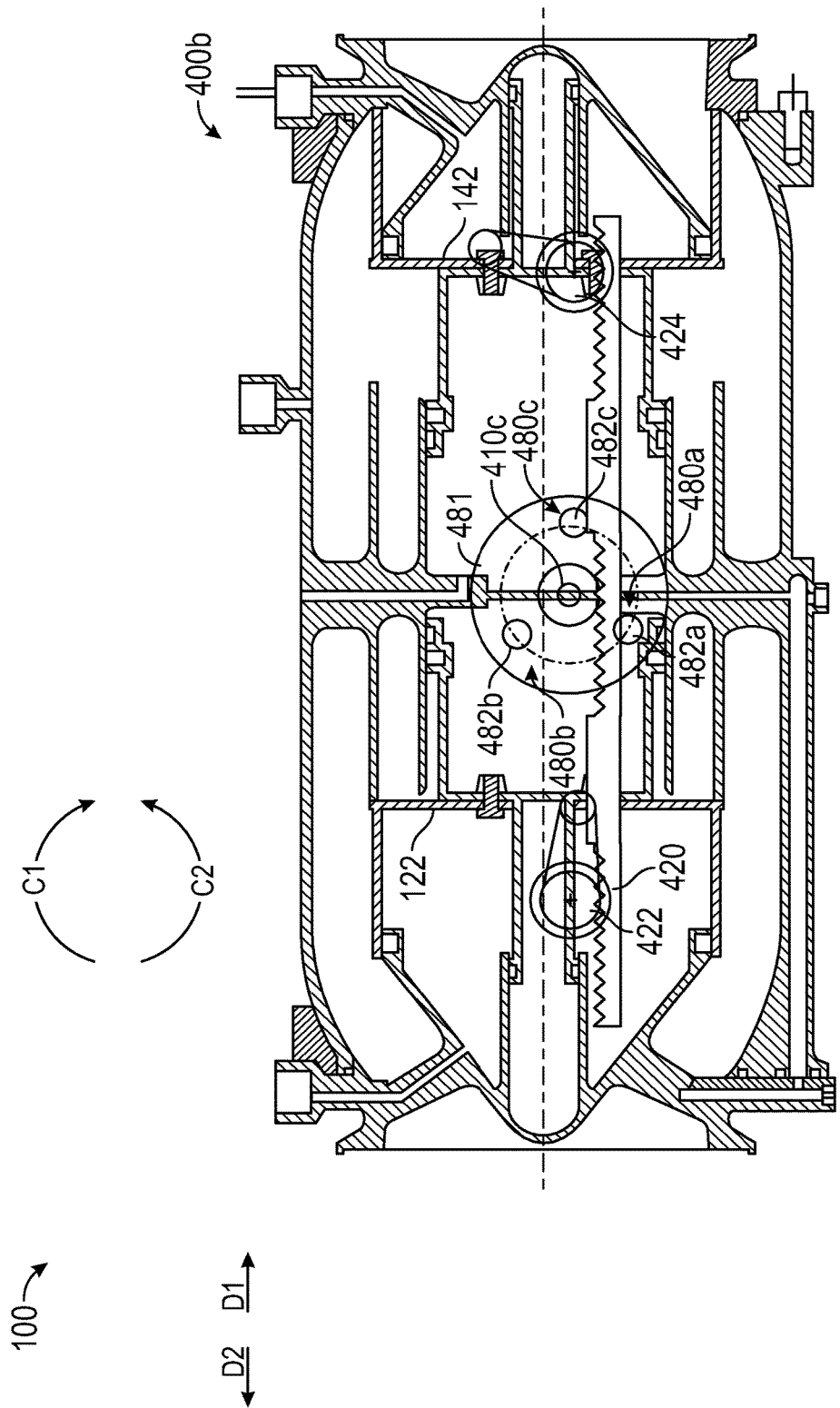
FIG. 14 is a schematic, cross-sectional illustration of a dual inline starter air valve having a single manual override with a first piston in an open position, in accordance with an embodiment of the present disclosure.
Figure 15:
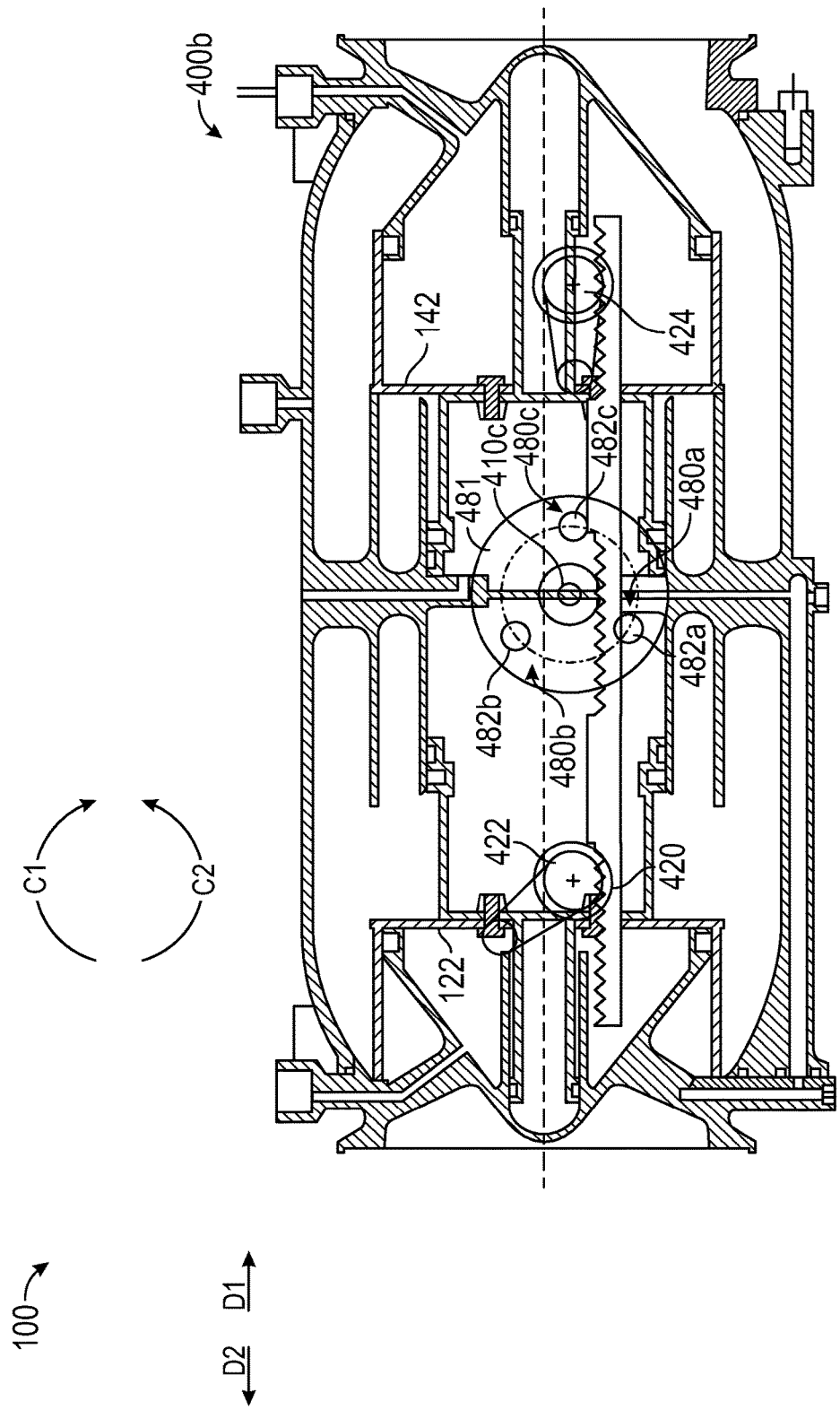
FIG. 15 is a schematic, cross-sectional illustration of a dual inline starter air valve having a single manual override with a second piston in an open position, in accordance with an embodiment of the present disclosure.

Referring now to FIGS. 5-15, with continued reference to FIGS. 2-4, FIGS. 6-12 show a dual manual override 400a in accordance with an embodiment of the disclosure and FIGS. 13-15 show a single manual override 400b in accordance with an embodiment of the disclosure. The dual inline starter air valve 100 shown in FIGS. 1-4 are for illustrative purposes and the manual override 400 (400a, 400b) may be incorporated in other two piston configurations not illustrated in FIGS. 1-4.

Referring first to the dual manual override 400a in FIGS. 6-12. The dual manual override 400a may be configured to move at least one of the first piston 122 and the second piston 142 to allow airflow 90 through the fluid passage 190. In the event a piston 122, 142 fails closed, the dual manual override 400a will manually force each of the first piston 122 and the second piston 142 from the closed position in FIG. 7 to the open position in FIG. 8. The dual manual override 400a includes a first manual override 401a and a second manual override 401b. The first manual override 401a is operable to force the first piston 122 from the closed position in FIG. 7 to the open position in FIG. 8. The second manual override 401b is operable to force the second piston 142 from the closed position in FIG. 7 to the open position in FIG. 8.

Figure 10:
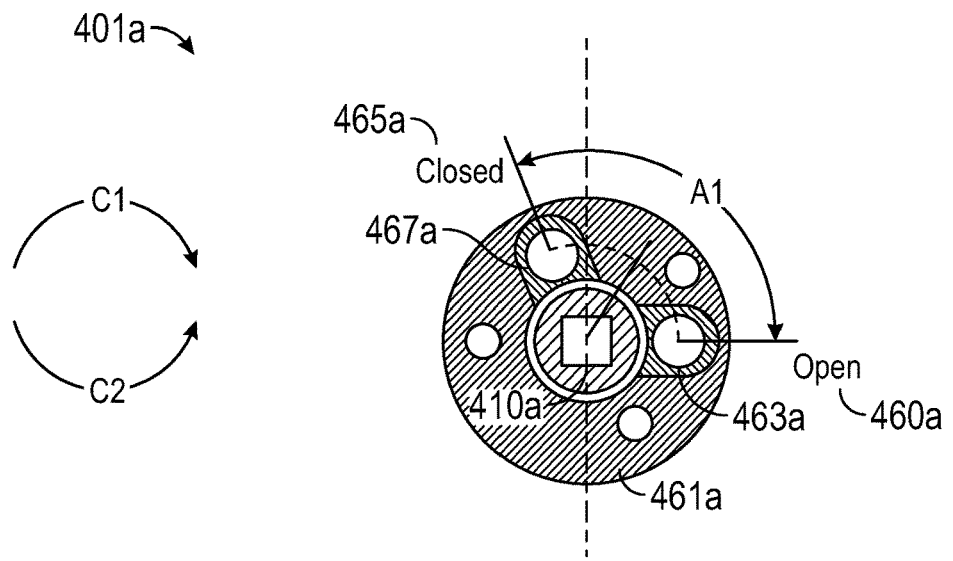
FIG. 10 is a schematic, top view illustration of a first ball detent system of the dual inline starter air valve of FIG. 6, in accordance with an embodiment of the present disclosure.

The first manual override 401a comprises a first input point 410a, a first ball detent system 405a, and a first control arm 422 operably connected to the first input point 410a and the first piston 122. The first input point 410a is operably connected to the first piston 122 through the first control arm 422. The first input point 410 is configured to open and close the first piston 122 as the first input point 410a is rotated clockwise C1 and counter clockwise C2 respectfully, as seen in FIG. 10. The rotation directions C1, C2 may be reversed.

Figure 9:
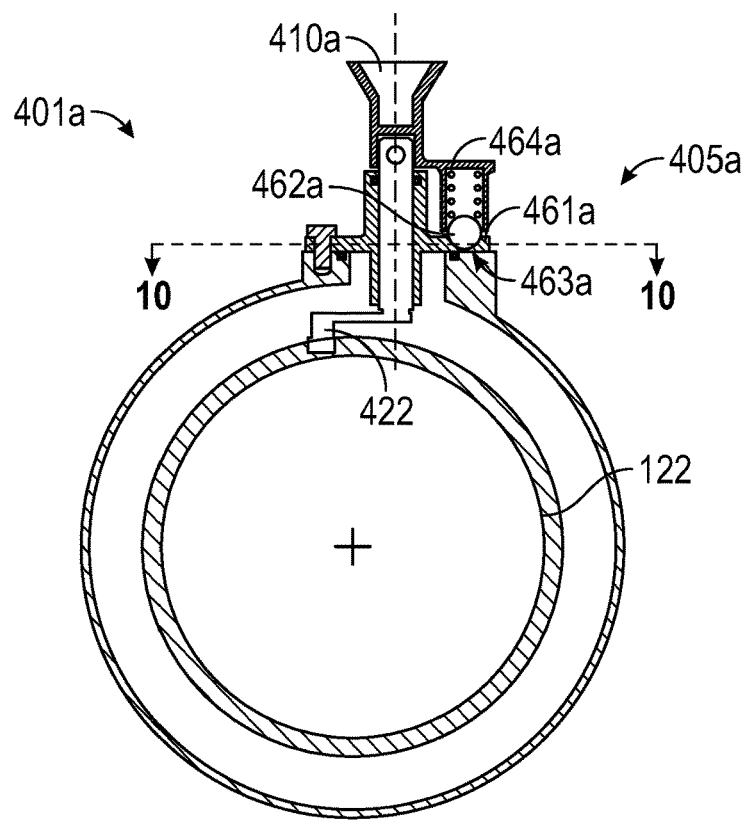
FIG. 9 is a schematic, axial view illustration of a first ball detent system of the dual inline starter air valve of FIG. 6, in accordance with an embodiment of the present disclosure.

In one example, the first input point 410 may be rotated by a mechanic with a tool. The first manual override 401a includes a first ball detent system 405a, as shown in FIG. 9. The a first ball detent system 405a is composed of a first plate 461a having a first open hole 463a at a first open position 460a and a first closed hole 467a at a first closed position 465a. As seen in FIG. 10, the first open position 460a may be located at a first selected angle A1 from first closed position 465a, such as, for example 112.7°. A first ball 462a is located opposite the first plate 461a and is pressed against the first plate 461a by a first biasing mechanism 464a. The first biasing mechanism 464a may be a spring.

The first ball detent system 405a is operable to lock the first manual override 401a in the first closed position 465a and/or the first open position 460a. While in the first closed position 465a the first biasing mechanism 464a presses the first ball 462a into the first closed hole 467a, which prevents the first manual override 401a from rotating until rotated manually at the first input point 410a. Then when the first manual override 401a is rotated clockwise C1 at the first input point 410a, the first ball 462a rolls over the first plate 461a until it reaches the first open hole 463a at the first open position 460a. While in the first open position 460a the first biasing mechanism 464a presses the first ball 462a into the first open hole 463a, which prevents the first manual override 401a from rotating until rotated manually at the first input point 410a.

The second manual override 401b comprises a second input point 410b, a second ball detent system 405b, and a second control arm 424 operably connected to the second input point 410b and the second piston 142. The second input point 410b is operably connected to the second piston 142 through the second control arm 424. The second input point 410b is configured to open and close the second piston 142 as the second input point 410b is rotated clockwise C1 and counter clockwise C2 respectfully, as seen in FIG. 12. The rotation directions C1, C2 may be reversed. In one example, the second input point 410 may be rotated by a mechanic with a tool. The second manual override 401b includes a second ball detent system 405b as shown in FIG. 11. The a second ball detent system 405b is composed of a second plate 461b having a second open hole 463b at a second open position 460b and a second closed hole 467b at a second closed position 465b. As seen in FIG. 12, the second open position 460b may be located at a second selected angle A2 from the second closed position 465b, such as, for example 112.7°. A second ball 462b is located opposite the second plate 461b and is pressed against the second plate 461b by a second biasing mechanism 464b. The second biasing mechanism 464b may be a spring.

The second ball detent system 405b is operable to lock the second manual override 401b in the second closed position 465b and/or the second open position 460b. While in the second closed position 465b the second biasing mechanism 464b presses the second ball 462b into the second closed hole 467b, which prevents the second manual override 401b from rotating until rotated manually at the second input point 410b. Then when the second manual override 401b is rotated clockwise C1 at the second input point 410b, the second ball 462b rolls over the second plate 461b until it reaches the second open hole 463b at the second open position 460b. While in the second open position 460b the second biasing mechanism 464b presses the second ball 462b into the second open hole 463b, which prevents the second manual override 401b from rotating until rotated manually at the second input point 410b.

Referring now to the single manual override 400b in FIGS. 13-15. The single manual override 400b may be configured to move at least one of the first piston 122 and the second piston 142 to allow airflow 90 through the fluid passage 190. Advantageously, the manual override system 400 will manually force the first piston 122 to the open position (see FIG. 14) or the second piston 142 to the open position (see FIG. 15). FIG. 13 shows a cross-sectional view of the single manual override 400b. The single manual override 400b includes a single input point 410c, a gear rack 420 operably connected to the single input point 410c, a first control arm 422 operably connected to the gear rack 420 and the first piston 122, and a second control arm 424 operably connected to the gear rack 420 and the second piston 142. The single input point 410c may be rotated either clockwise C1 or counter clockwise C2 in order to open either the first piston 122 or the second piston 142. In one example, the single input point 410c may be rotated by a mechanic with a wrench.

The gear rack 420 is configured to translate laterally in at least one of the first direction D1 and the second direction D2 in response to the rotation of the single input point 410c. The lateral translation of the gear rack 420 rotates the two control arms 422, 424 to open the pistons 122, 142. In an embodiment, the gear rack 420 include gear teeth that mesh with complimentary gear teeth on the first control arm 422 and the second control arm 424, and the translation of the gear rack 420 is converted to rotation of the control arms 422, 424 through the gear teeth interaction. In another embodiment, the single input point 410 includes gear teeth that mesh with complimentary gear teeth on the gear rack 420, and the rotation of the single input point 410c is converted to translation of the gear rack 420 through the gear teeth interaction. FIG. 14 shows the first piston 122 in the open position and FIG. 15 shows the second piston 142 in the open position. The manual override system 400 also includes a ball detent system 405c to secure the manual override system 400 in three separate positions including a neutral position 480c disengaging the single manual override 400c from the first piston 122 and the second piston 142, a first open position 480a for when the first piston 122 is forced to the open position, and a second open position 480b for when the second piston 142 is forced to the open position. The neutral position 460c allows for normal operation of the first piston 122 and the second piston 142 are controlled by the controller 200 as described above.

The ball detent system 405c is composed of a plate 481 having a first open hole 482a at the first open position 480a, a second open hole 482b at the second open position 480b, and a neutral hole 482c at the neutral position 480c. A ball 485 is located opposite the plate 481 and is pressed against the plate 481 by a biasing mechanism 484. The biasing mechanism 484 may be a spring.

The ball detent system 405c is operable to lock the single manual override 400b in a first open position 480a forcing the first piston 122 open, a second open position 480b forcing the second piston 142 open and/or a neutral position 480c where neither piston 122, 142 is forced open. While in the neutral position 480c, the biasing mechanism 484 presses the ball 485 into the neutral hole 482c, which prevents the single manual override 400b from rotating until rotated manually at the single input point 410c. When the first piston 122 fails closed, the single manual override 400b is rotated clockwise C1 at the single input point 410c, the ball 485 then rolls over the plate 481 until it reaches the first open hole 482a at the first open position 480a. As the single input point 410c is rotated clockwise C1 the gear rack 420 translates in a second direction D2, which rotates the first control arm 422 to force the first piston 122 to the open position (see FIG. 14). While in the first open position 480a, the biasing mechanism 484 presses the ball 485 into the first open hole 482a, which prevents the single manual override 400b from rotating until rotated manually at the single input point 410c. While in the first open position 480a, the first piston 122 is locked in the open position as show in FIG. 14.

When the second piston 142 fails closed, the single manual override 400b is rotated counterclockwise C2 at the single input point 410c, the ball 485 then rolls over the plate 481 until it reaches the second open hole 482b at the second open position 480b. As the single input point 410c is rotated counter clockwise C2 the gear rack 420 translates in a first direction D1, which rotates the second control arm 424 to force the second piston 142 to the open position (see FIG. 15). While in the second open position 480b, the biasing mechanism 484 presses the ball 485 into the second open hole 482b, which prevents the single manual override 400b from rotating until rotated manually at the single input point 410c. While in the second open position 480b, the second piston 142 is locked in the open position as show in FIG. 15.

Advantageously, by forcing either the first piston 122 or the second piston 142 to the open position manually when they fail closed, allows the non-failed piston to be modulated and BRM to be performed.

Figure 16:
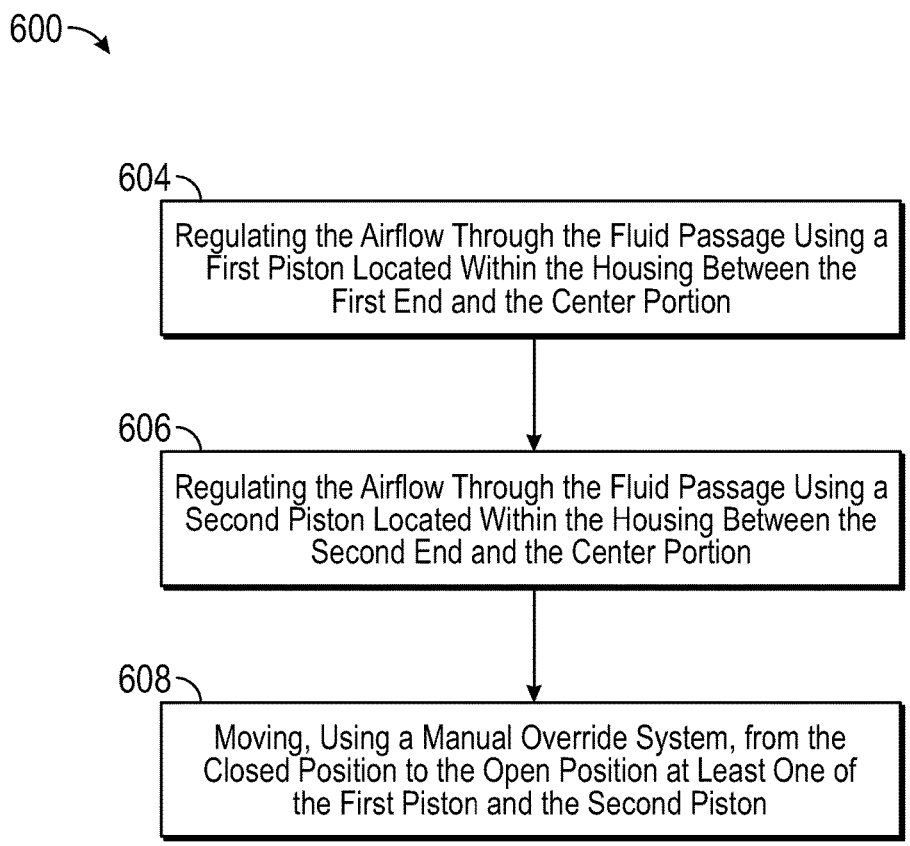
FIG. 16 is a flow process illustrating a method of operating the dual inline starter air valve FIGS. 2-15, according to an embodiment of the present disclosure.

Referring now to FIG. 16, with continued reference to FIGS. 2-15, FIG. 16 shows a flow process illustrating a method 600 of operating the isolation valve 100 of FIGS. 2-15, according to an embodiment of the present disclosure. At block 604, airflow 90 is regulated through the fluid passage 190 using a first piston 122 located within the housing 110 between the first end 112 and the center portion 116. The first piston 112 configured to block airflow 90 through the fluid passage 190 when in a closed position (see FIG. 3) and allow airflow 90 through the fluid passage 190 when in an open position (see FIG. 2). At block 606, airflow 90 is regulated through the fluid passage 190 using a second piston 142 located within the housing 110 between the second end 114 and the center portion 116. The second piston 142 configured to block airflow 90 through the fluid passage 190 when in a closed position (see FIG. 3) and allow airflow 90 through the fluid passage 190 when in an open position (see FIG. 2). At block 608, a manual override system 400 moves from the closed position to the open position at least one of the first piston 122 and the second piston 142. The manual override system 400 may be the dual manual override 400a of FIGS. 6-12 or single manual override 400b of FIGS. 13-15.

While the above description has described the flow process of FIG. 16 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A starter air valve comprising:
a housing comprising an inlet at a first end, an outlet at a second end opposite the first end, and a center portion between the first end and the second end, the outlet being fluidly connected to the inlet through a fluid passage;
a first piston located within the housing between the first end and the center portion, the first piston configured to block airflow through the fluid passage when in a closed position and allow airflow through the fluid passage when in an open position;
a second piston located within the housing between the second end and the center portion, the second piston configured to block airflow through the fluid passage when in a closed position and allow airflow through the fluid passage when in an open position; and
a manual override system configured to move from the closed position to the open position at least one of the first piston and the second piston, the manual override system including a dual manual override, the dual manual override comprising:
a first manual override having a first input point operably connected to the first piston through a first control arm, the first input point configured to rotate the first control arm when the first input point is rotated, wherein the first piston moves from the closed position to the open position when the first control arm is rotated, and
wherein the first manual override further comprises:
a first ball detent system operable to lock the first manual override in a first open position, wherein the first ball detent system further comprises:
a first plate having a first open hole at the first open position;
a first ball located opposite the first plate; and
a first biasing mechanism configured to press first ball against the first plate and secure the first ball in the first open hole when first ball detent system is in the first open position.

2. The starter air valve of claim 1, wherein:
the dual manual override further comprises:
a second manual override having a second input point operably connected to the second piston through a second control arm, the second input point configured to rotate the second control arm when the second input point is rotated, wherein the second piston moves from the closed position to the open position when the second control arm is rotated.

3. The starter air valve of claim 2, wherein the second manual override further comprises:
a second ball detent system operable to lock the second manual override in a second open position, wherein the second ball detent system further comprises:
a second plate having a second open hole at the second open position;
a second ball located opposite the second plate; and
a second biasing mechanism configured to press second ball against the second plate and secure the second ball in the second open hole when second ball detent system is in the second open position.

4. A starter air valve comprising:
a housing comprising an inlet at a first end, an outlet at a second end opposite the first end, and a center portion between the first end and the second end, the outlet being fluidly connected to the inlet through a fluid passage;
a first piston located within the housing between the first end and the center portion, the first piston configured to block airflow through the fluid passage when in a closed position and allow airflow through the fluid passage when in an open position;
a second piston located within the housing between the second end and the center portion, the second piston configured to block airflow through the fluid passage when in a closed position and allow airflow through the fluid passage when in an open position; and
a manual override system configured to move from the closed position to the open position at least one of the first piston and the second piston, wherein the manual override system includes a single manual override, the single manual override further comprising:
a single input point;
a gear rack operably connected to the single input point;
a first control arm operably connecting the first piston to the gear rack;
a second control arm operably connecting the second piston to the gear rack; and
a ball detent system operable to lock the single manual override in at least one of a neutral position disengaging the single manual override from the first piston and the second piston, a first open position when the first piston is in the open position, and a second open position when the second piston is in the open position.

5. The starter air valve of claim 4, wherein:
the gear rack is configured to translate in at least one of a first direction and a second direction when the single input point is rotated.

6. The starter air valve of claim 5, wherein:
the first control arm rotates when the gear rack translates in a second direction; and
the first piston moves from the closed position to the open position when the first control arm is rotated.

7. The starter air valve of claim 5, wherein:
the second control arm rotates when the gear rack translates in a first direction; and
the second piston moves from the closed position to the open position when the second control arm is rotated.

8. The starter air valve of claim 4, wherein the ball detent system further comprises:
a plate having a first open hole at the first open position, a second open hole at the second open position, and a neutral hole at the neutral position;
a ball located opposite the plate;
a biasing mechanism configured to press the ball against the plate and secure the ball
in at least one of the first open hole when the single manual override is in the first open position, the second open hole when the single manual override is in the second open position, and the neutral hole when the single manual override is in the neutral position.

9. A method of operating a starter air valve comprising a housing having an inlet at a first end, an outlet at a second end opposite the first end, and a center portion between the first end and the second end, the outlet being fluidly connected to the inlet through a fluid passage, the method comprising:
regulating the airflow through the fluid passage using a first piston located within the housing between the first end and the center portion, the first piston configured to block airflow through the fluid passage when in a closed position and allow airflow through the fluid passage when in an open position;
regulating the airflow through the fluid passage using a second piston located within the housing between the second end and the center portion, the second piston configured to block airflow through the fluid passage when in a closed position and allow airflow through the fluid passage when in an open position;
moving, using a manual override system, from the closed position to the open position at least one of the first piston and the second piston;
rotating a first input point of a first manual override within the manual override system, the first input point operably connected to the first piston through a first control arm and configured to rotate the first control arm when the first input point is rotated, wherein the first piston moves from the closed position to the open position when the first control arm is rotated;
locking the first manual override in a first open position, using a first ball detent system,
wherein the first ball detent system comprises:
a first plate having a first open hole at the first open position;
a first ball located opposite the first plate; and
a first biasing mechanism configured to press the first ball against the first plate and secure the first ball in the first open hole when first ball detent system is in the first open position.

10. The method of claim 9, further comprising:
rotating a second input point of a second manual override within the manual override system, the second input point operably connected to the second piston through a second control arm and configured to rotate the second control arm when the second input point is rotated, wherein the second piston moves from the closed position to the open position when the second control arm is rotated.

11. A method of operating a starter air valve comprising a housing having an inlet at a first end, an outlet at a second end opposite the first end, and a center portion between the first end and the second end, the outlet being fluidly connected to the inlet through a fluid passage, the method comprising:
regulating the airflow through the fluid passage using a first piston located within the housing between the first end and the center portion, the first piston configured to block airflow through the fluid passage when in a closed position and allow airflow through the fluid passage when in an open position;
regulating the airflow through the fluid passage using a second piston located within the housing between the second end and the center portion, the second piston configured to block airflow through the fluid passage when in a closed position and allow airflow through the fluid passage when in an open position;

moving, using a manual override system, from the closed position to the open position at least one of the first piston and the second piston;

rotating a single input point of a single manual override within the manual override system, wherein the single manual override comprises:
- a gear rack operably connected to the single input point;
- a first control arm operably connecting the first piston to the gear rack; and
- a second control arm operably connecting the second piston to the gear rack;

translating the gear rack in at least one of a first direction and a second direction when the single input point is rotated; and locking, using a ball detent system, the single manual override in at least one of a neutral position disengaging the single manual override from the first piston and the second piston, a first open position when the first piston is in the open position, and a second open position when the second piston is in the open position.

12. The method of claim 11, further comprising:

rotating the first control arm when the gear rack translates in the second direction, wherein the first piston moves from the closed position to the open position when the first control arm is rotated.

13. The method of claim 11, further comprising:

rotating the second control arm when the gear rack translates in the first direction, wherein the second piston moves from the closed position to the open position when the second control arm is rotated.

* * * * *